United States Patent

[11] 3,571,919

[72] Inventors Paul S. Gleim
Dallas;
Kenneth E. Bean; Stephen P. Emmons,
Richardson, Tex.
[21] Appl. No. 764,038
[22] Filed Sept. 25, 1968
[45] Patented Mar. 23, 1971
[73] Assignee Texas Instruments Incorporated
Dallas, Tex.
Continuation of application Ser. No.
491,617, Sept. 30, 1965, now abandoned.

[54] SEMICONDUCTOR DEVICE FABRICATION
4 Claims, 18 Drawing Figs.

[52] U.S. Cl. ........ 29/577, 29/576, 29/580, 148/1.5
[51] Int. Cl. ........ B01i 17/00, H01i 1/16, H01i 1/24
[50] Field of Search ........ 148/1.5; 317/101, 234, 235; 29/576 (IW), 577, 580

[56] References Cited

UNITED STATES PATENTS

| | | | |
|---|---|---|---|
| 3,332,137 | 7/1967 | Kenney | 29/423 |
| 3,080,841 | 3/1963 | Denobel | 148/179X |
| 3,246,214 | 4/1966 | Hugle | 317/235 |
| 3,247,428 | 4/1966 | Perry | 317/234 |
| 3,290,753 | 12/1966 | Chang | 29/25 |
| 3,300,832 | 1/1967 | Cave | 29/25 |
| 3,308,354 | 3/1967 | Tucker | 29/155.5X |
| 3,290,753 | 12/1966 | Chang | 29/576 |
| 3,320,485 | 5/1967 | Buie | 317/235 |
| 3,397,448 | 8/1968 | Tucker | 29/577 |

OTHER REFERENCES

" Electronic Equipment Engineering," Dec. 1964, pages 18— 20.
" Electronics Review," Vol. 37, No. 17, Jun. 1, 1964 p. 23

*Primary Examiner*—John F. Campbell
*Assistant Examiner*—Richard Bernard Lazarus
*Attorneys*—Samuel M. Mims, Jr., James O. Dixon, Andrew M. Hassell, Harold Levine, John E. Vandigriff, Rene E. Grossman and Virgil Lawrence Sewell

ABSTRACT: Disclosed is a method of forming a semiconductor device having circuit components in a semiconductor substrate which are electrically isolated from each other by a layer of etch resistant material. During the fabrication of the device the etch resistant material acts as an etch barrier that prevents the etchant from removing any portion of the semiconductor substrate used for the circuit components.

INVENTORS
Paul S. Gleim
Kenneth E. Bean
Stephen P. Emmons

BY John D. Graham
ATTORNEY

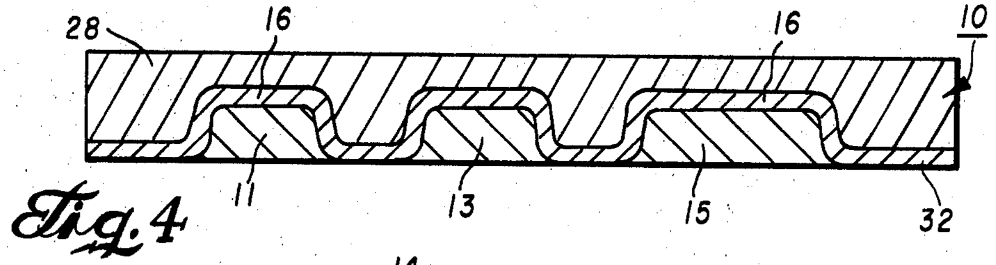
Fig. 4
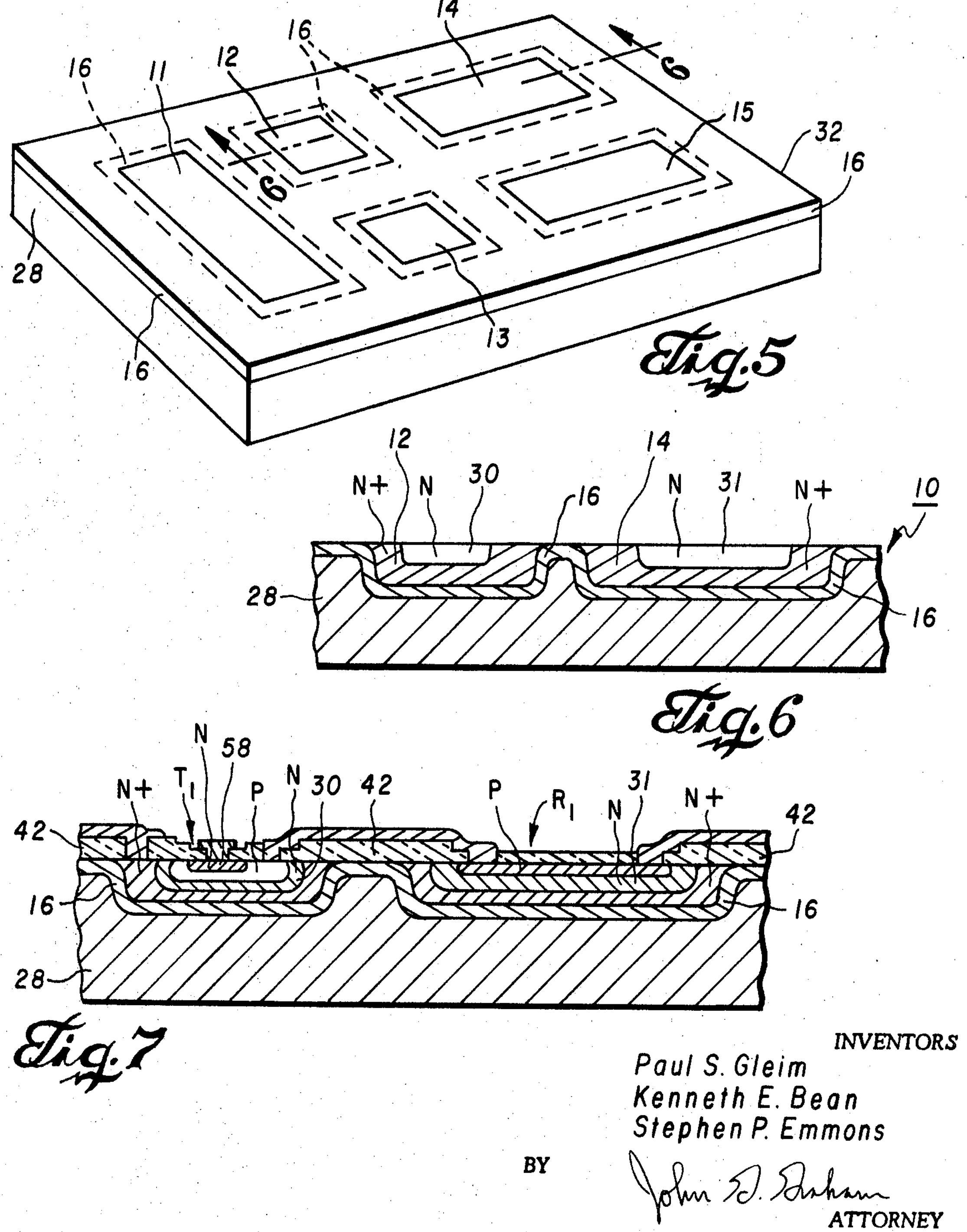
Fig. 5, Fig. 6
Fig. 7
INVENTORS
Paul S. Gleim
Kenneth E. Bean
Stephen P. Emmons
BY John E. Graham
ATTORNEY INVENTORS
Paul S. Gleim
Kenneth E. Bean
Stephen P. Emmons BY John D. Graham [signature]
ATTORNEY INVENTORS
Paul S. Gleim
Kenneth E. Bean
Stephen P. Emmons
BY [signature]
ATTORNEY INVENTORS
Paul S. Gleim
Kenneth E. Bean
Stephen P. Emmons
BY
John E. Graham [signature]
ATTORNEY INVENTORS
Paul S. Gleim
Kenneth E. Bean
Stephen P. Emmons BY John D. Graham
ATTORNEY INVENTORS
Paul S. Gleim
Kenneth E. Bean
Stephen P. Emmons BY John D. Graham
ATTORNEY

SEMICONDUCTOR DEVICE FABRICATION

This application is a continuation of Ser. No. 30, 1965, now abandoned.

This invention relates to a method for fabricating semiconductor components, and more particularly to a method whereby the semiconductor components are joined by a common substrate but yet are electrically isolated from each other.

As the miniaturization of electronic circuits has evolved, it has been realized that one of the greatest potentials in microelectronics due to the greater reliability in performance and substantial savings in cost and space is being offered by a method whereby individual components such as transistors, resistors, diodes, etc. are formed within a single piece of semiconductor material, preferably single crystal, the components being interconnected to perform the desired circuit function. The resulting structure is referred to as an integrated circuit.

The formation of all components in one single crystal semiconductor substrate, however, presents the problem of electrically isolating the circuit components from one another. In particular, when a number of transistors and resistors are formed within one portion of the substrate, with the substrate forming the collector region of each of the transistors, it is necessary for many circuit applications to isolate the transistors from each other to avoid the collectors from being commoned, and to isolate the transistors from the resistors. Many techniques have been developed to accomplish this isolation, all of them possessing certain disadvantages.

A novel thermal print head has also been designed, utilizing integrated circuit techniques, a description of which is the subject of a copending application Ser. No. 492,174, filed Sept. 30, 1965 whereby a matrix of individual printing elements are located on an insulating substrate (ceramic), the successful operation of these individual mesa printing elements depending, in large, upon a fabrication technique which substantially thermally isolates the elements from one another.

It is therefore a principal object of this invention to provide an improved method of integrated circuit fabrication whereby all of the necessary circuit components of an integrated circuit are joined by a common substrate but yet are electrically isolated from each other.

It is another object of the invention to provide a process for fabricating a thermal print head which provides substantial thermal isolation between the individual printing elements.

In accordance with these objects and other objects and features, one embodiment of the present invention involves forming individual circuit components within pockets of a wafer of monocrystalline semiconductor material adjacent a body of polycrystalline semiconductor material with a layer of silicon carbide, preferably of high resistivity, intermediate the pockets and the body, forming leads and interconnections between the circuit components, mounting the entire structure upon an insulating or ceramic substrate face down with the interconnections making ohmic contact with expanded leads on the face of the ceramic substrate, and then etching away all of the polycrystalline body, whereby each of the individual interconnected circuit components remain mounted in mesas upon the ceramic substrate electrically isolated from each other by the silicon carbide layer and the surrounding ambient.

In another embodiment of the invention, the mesas referred to above serve as the thermal printing elements, interconnected diode-resistor pairs having been formed within the mesas. The removal of the polycrystalline material, in addition to providing electrical isolation of the diode-resistor pairs from each other, provides substantial thermal isolation between the mesa printing elements.

The essential feature of the two embodiments is the use of the silicon carbide as an "etch barrier" to the etchant which removes all of the polycrystalline semiconductor material but leaves the underlying wafer in which the components are formed (the mesas) substantially unaffected due to the protection afforded by the silicon carbide.

The novel features believed characteristic of this invention are set forth in the appended claims. The invention itself, however, as well as other objects and advantages thereof, may best be understood by reference to the following detailed description of illustrative embodiments, read in conjunction with the accompanying drawings, wherein:

FIGS. 3 and 4 are elevational views in section of the semiconductor body of FIG. 1 in successive stages of production;

FIG. 5 is a pictorial view of the lower side of the semiconductor body of FIG. 4 after the body has been inverted;

FIG. 6 is a sectional view of a portion of the wafer of FIG. 5 taken along the line 6–6, showing a subsequent step of the process of this invention;

FIG. 7 is the same sectional view as FIG. 6 after diffusion operations have been completed and interconnections have been applied;

Figure 13:
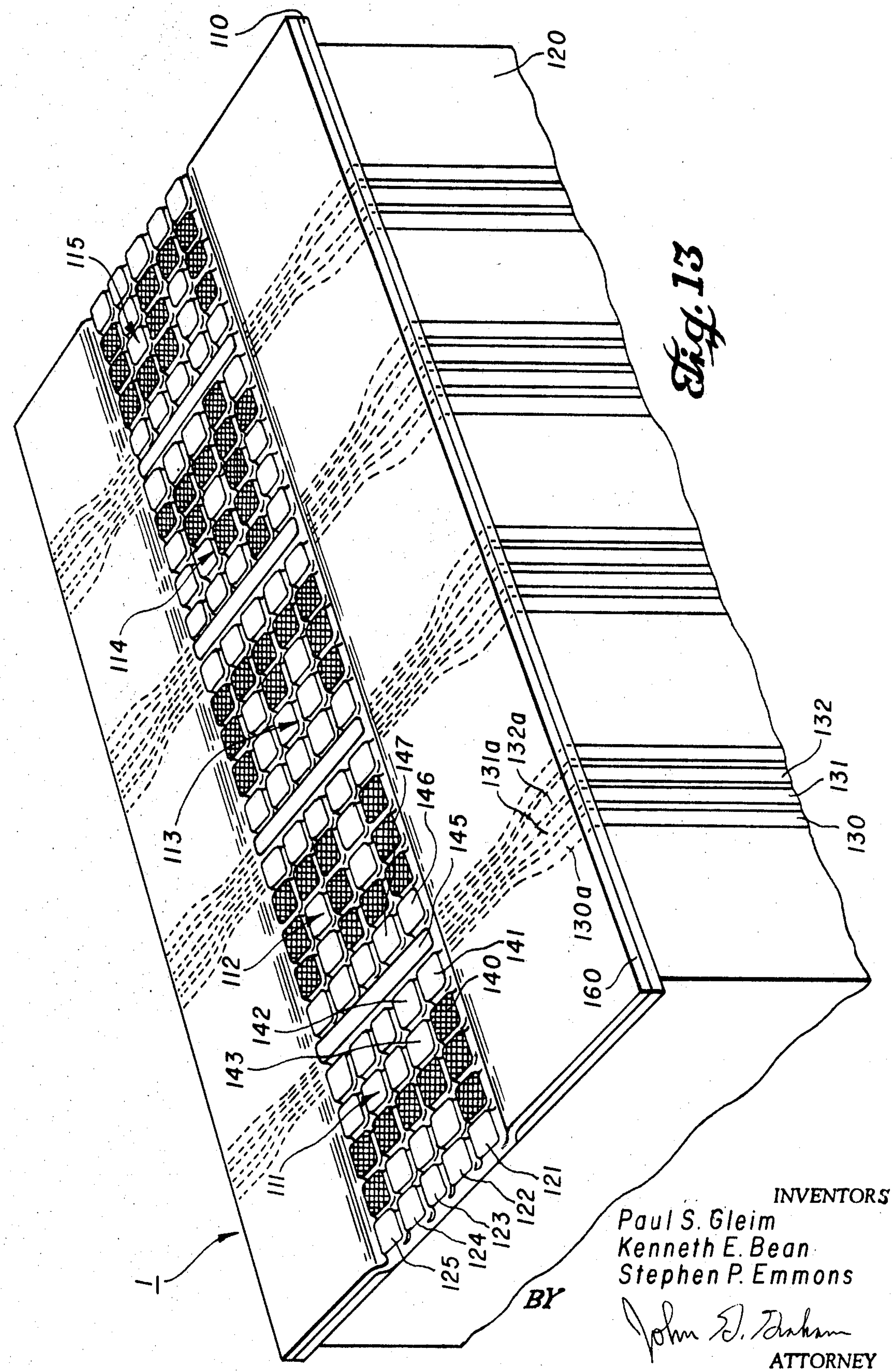
FIG. 13 is a top view of a thermal print head showing an array or matrix of mesa heating elements with selected elements energized to define the numbers 1, 2, 3, 4, and 5.
Figure 14:
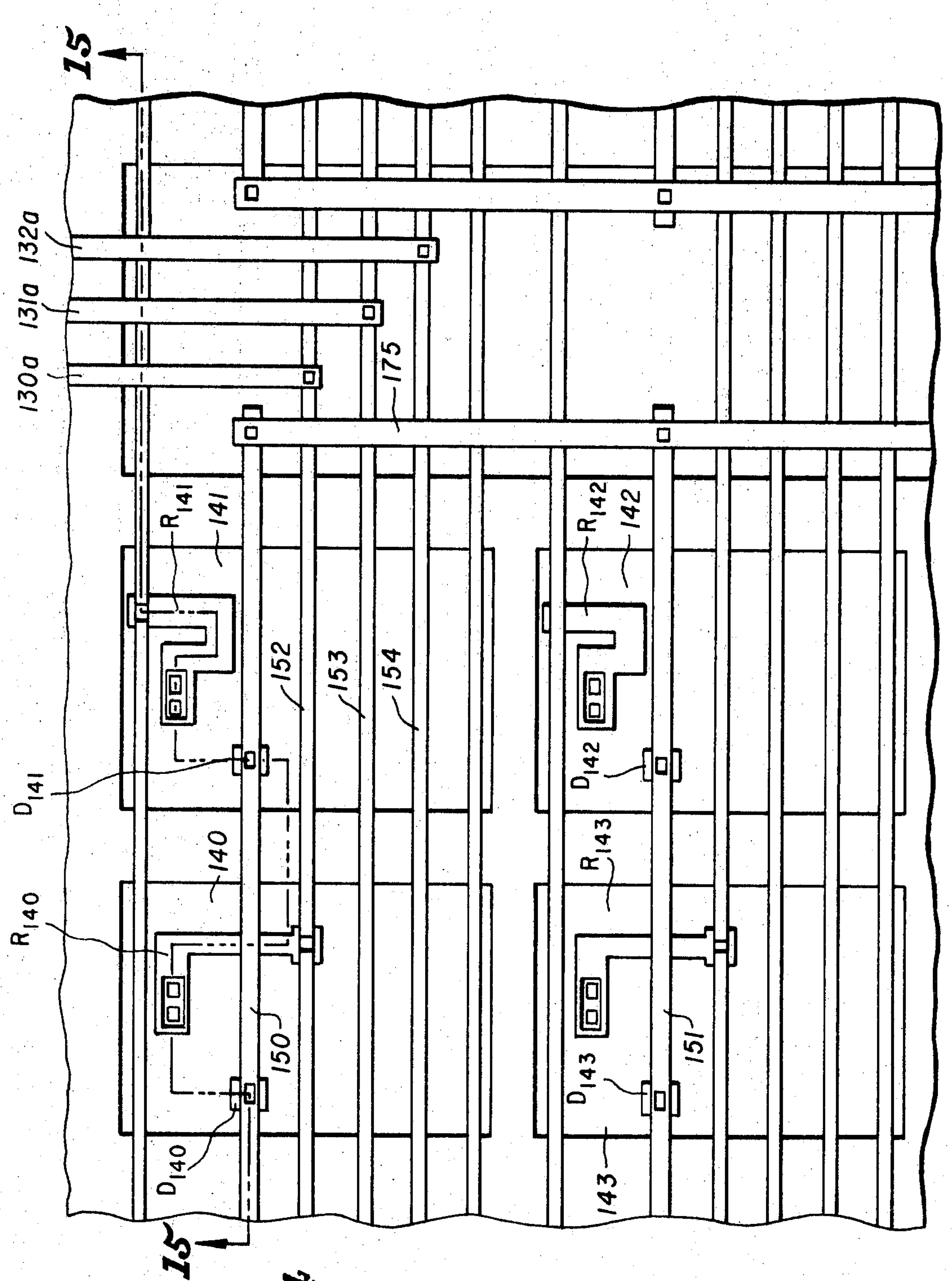

FIG. 14 is an underside view of a portion of the array shown in FIG. 13, illustrating the formation of diode resistor pairs within each mesa element, and the lead and expanded interconnection pattern between elements; and FIGS. 15—18 are sectional views of a portion of the heating elements shown in FIG. 14, taken along the section line 15–15, and depicting subsequent steps in the fabrication of the print head.

Figure 1:
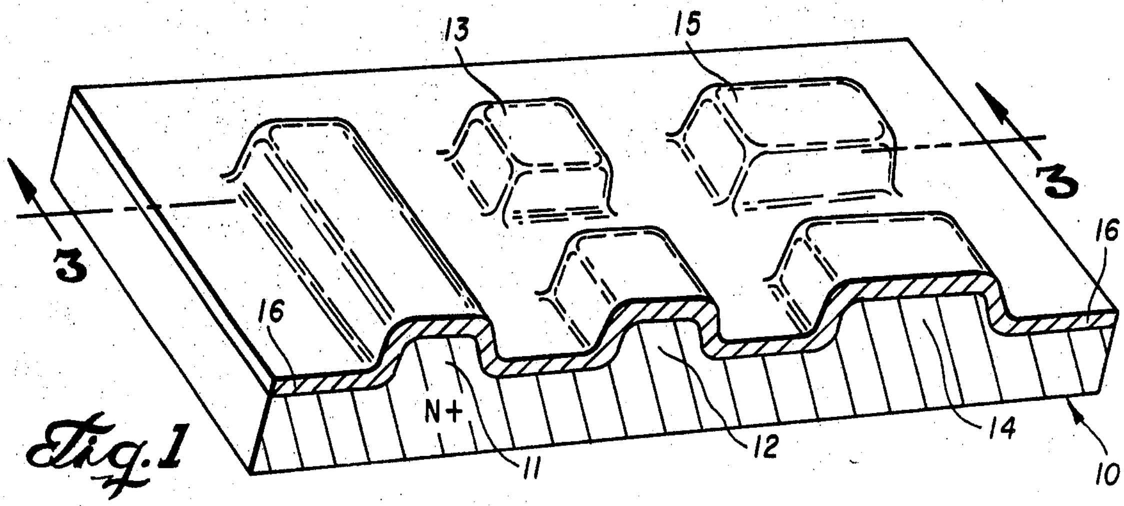
FIG. 1 is a pictorial view in section of a semiconductor wafer in an early stage of the production of an integrated circuit in accordance with the process of this invention.

Referring now to FIG. 1, there is described the first step in one embodiment of this invention. A slice of low resistivity N+ single crystal semiconductor material, such as silicon, is used as the starting material. The slice may be about 1 inch in diameter and 10 mils thick. A small segment of the slice may be represented as a chip or wafer 10, this segment representing the space to be occupied by one integrated circuit. The top surface of the slice is first masked and etched to form a pattern of raised mesas, for example 11—15. The masking may be by a material such as wax, or preferably by conventional photoresist techniques which permit excellent geometry control. The height of the mesas 11—15, or, in other words, the depth of the etching, may be about 2 mils. At this point the top surface of the slice is covered with a coating 16 of high resistivity silicon carbide which may be formed by any conventional technique to a thickness of perhaps 0.5 mil or more.

Figure 2:
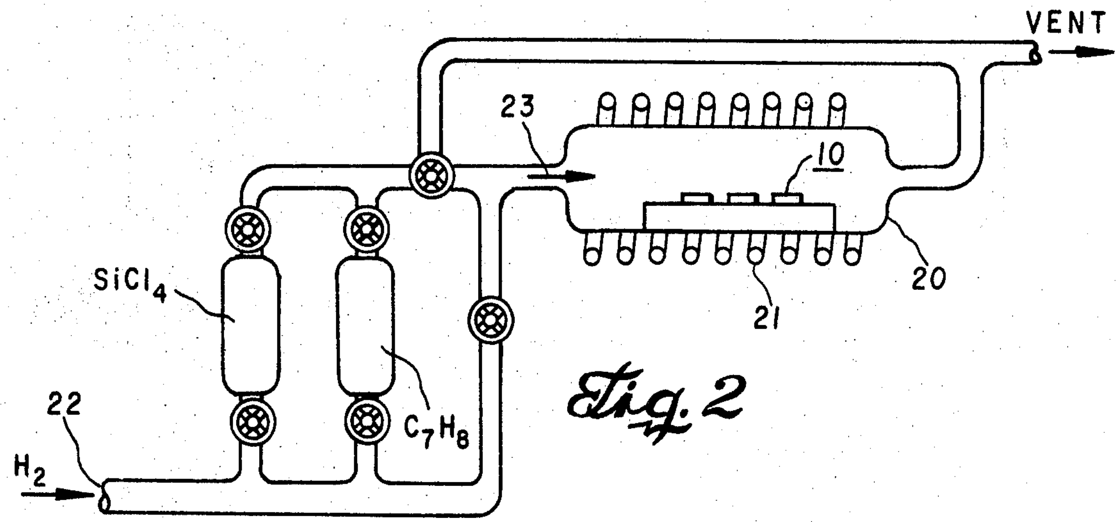
FIG. 2 is a front elevation of one form of apparatus used in the process of this invention.

One method of depositing the silicon carbide is described with reference to FIG. 2. Apparatus for depositing the silicon carbide in accordance with the process comprises a reactor in the form of a tube furnace 20 having heating coils 21. The furnace may be of a horizontal or vertical type, may be suited for single or multiple slices, and may be either resistively or inductively heated. Silicon wafers, including the wafer 10, are disposed within the furnace in such a position as to expose the slices to gases directed into the tube through a conduit 23. Toulene ($C7H_8$) and silicon tetrachloride ($SiCl_4$) vapors are respectively introduced into the conduit 23 from cylinders containing liquid toulene and liquid silicon tetrachloride, through which hydrogen gas is bubbled. Purified dried hydrogen enters end 22 of the conduit. The flow of the gases into the tube furnace 20 is regulated by conventional valves.

The rate of deposition is determined largely by the temperature at which the reactor is maintained, the flow rate through the conduit 23, and the percentage composition of the constituents. For example, when the flow rate was kept at approximately 10 liters/minute, the temperature at approximately 1080° C., and the reactive mixture consisted of 0.87 mol percent $SiCl_4$, 0.18 mol percent $C_7H_8$, and the remaining mol percent $H_2$, a layer of silicon carbide was deposited upon the wafer 10 as seen in FIG. 1 at a rate of approximately 1 micron/minute.

Figure 3:
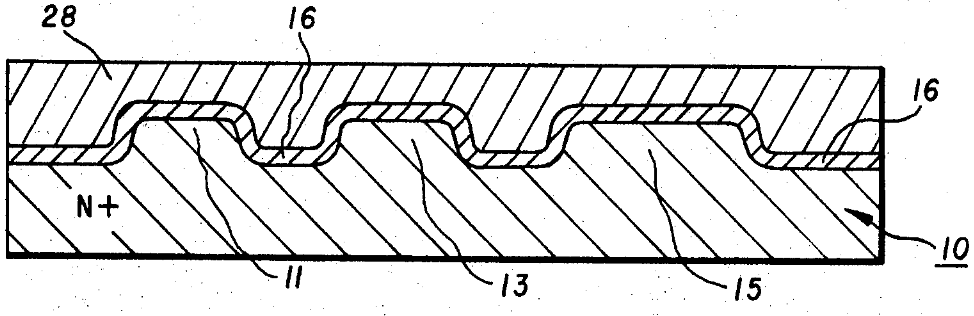

A layer 28 of material, for example polycrystalline semiconductor material, is now deposited over the top surface of the slice 10, as seen in FIG. 3. The most common method of deposition is by the hydrogen reduction of silicon tetrachloride, a technique well known in the art and requiring no elaboration here. The conductivity-type of the layer 28 is not critical as it may be N-type, P-type, or intrinsic, and the thickness of the layer should be perhaps 7 or 8 mils or more to facilitate handling the unit without breakage. The layer may also be either monocrystalline or amorphous.

As the next step in the process of this invention, the structure of FIG. 3 is subjected to a lapping and polishing treatment on its lower face to remove all of the original silicon material except that portion remaining within the mesas 11—15, as illustrated in FIG. 4, the lower portions of the silicon carbide layer 16 serving as a substantially continuous "stop" to the lapping and polishing operation.

Inverting the device and looking at what was the bottom surface of face 32 of FIG. 4, but will now be considered the top face of the unit, the structure will appear as in FIG. 5. Each of the low resistivity N+ monocrystalline portions or pockets 11—15 is insulated from the others and from the substrate or layer 28 by the silicon carbide coating 16. This coating 16 is not shown to scale in the drawings, and would actually be perhaps an order of magnitude thinner in proportion than is shown in the sectional view of the drawings.

The low resistivity portions 11—15 are then selectively masked and, using a vapor etch and epitaxial redeposition process, for example the one shown and described in copending application, Ser. No. 435,633, filed Feb. 26, 1965, and assigned to the assignee of the present invention, select portions of the N+ low resistivity material are removed and replaced by high resistivity semiconducting material. The resulting structure is shown with respect to two of the regions in FIG. 6 wherein high resistivity N-type regions 30 and 31 are formed adjacent the low resistivity N+ regions 12 and 14 respectively.

The regions 30 and 31 now serve as regions into which subsequent diffusions, or upon which epitaxial depositions, may be made in order to fabricate various components of an integrated circuit. Referring now to FIG. 7, a sectional view of a portion of a completed integrated circuit is seen, with an NPN transistor $T_1$ and a resistor $R_1$ having been formed by diffusion in the N-type redeposited regions 30 and 31. A P-type diffused region provides the base of the transistor, while an elongated P-type region formed simultaneously with the base provides the resistor $R_1$. An N-type diffused region 58 provides the transistor $T_1$ emitter. The diffusion operations utilize conventional silicon oxide masking so that an oxide layer 42 acquires a stepped configuration in the final device. Openings are made in the oxide where contact is necessary, then metal film is deposited over the oxide and selectively removed to provide the desired contacts, interconnections, and bonding pads.

Figure 8:
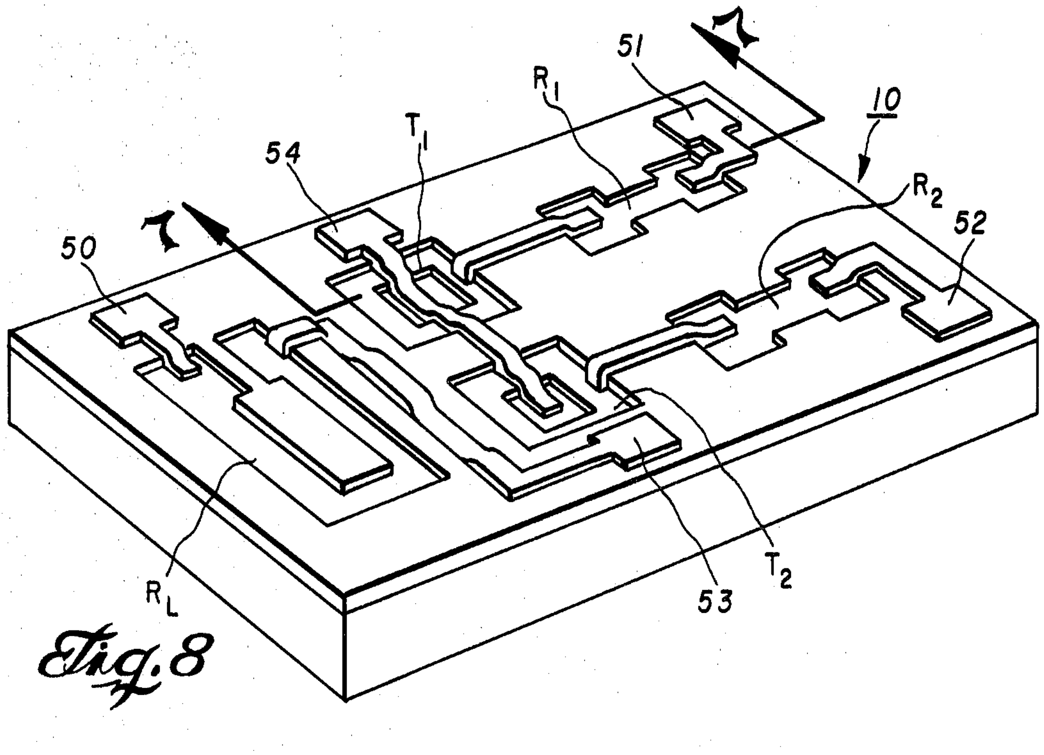
FIG. 8 is a pictorial view of the device described with reference to FIGS. 1—7.

The resulting structure or device 10 is shown in FIG. 8 with the transistors $T_1$ and $T_2$ and the resistors $R_1$, $R_2$, and $R_L$ along with the metal film interconnections providing a logic circuit. Bonding pads 50—54 are provided to allow interconnection with the metallized lead pattern on the ceramic substrate upon which the device 10 is to be subsequently mounted.

Figures 9, 11:
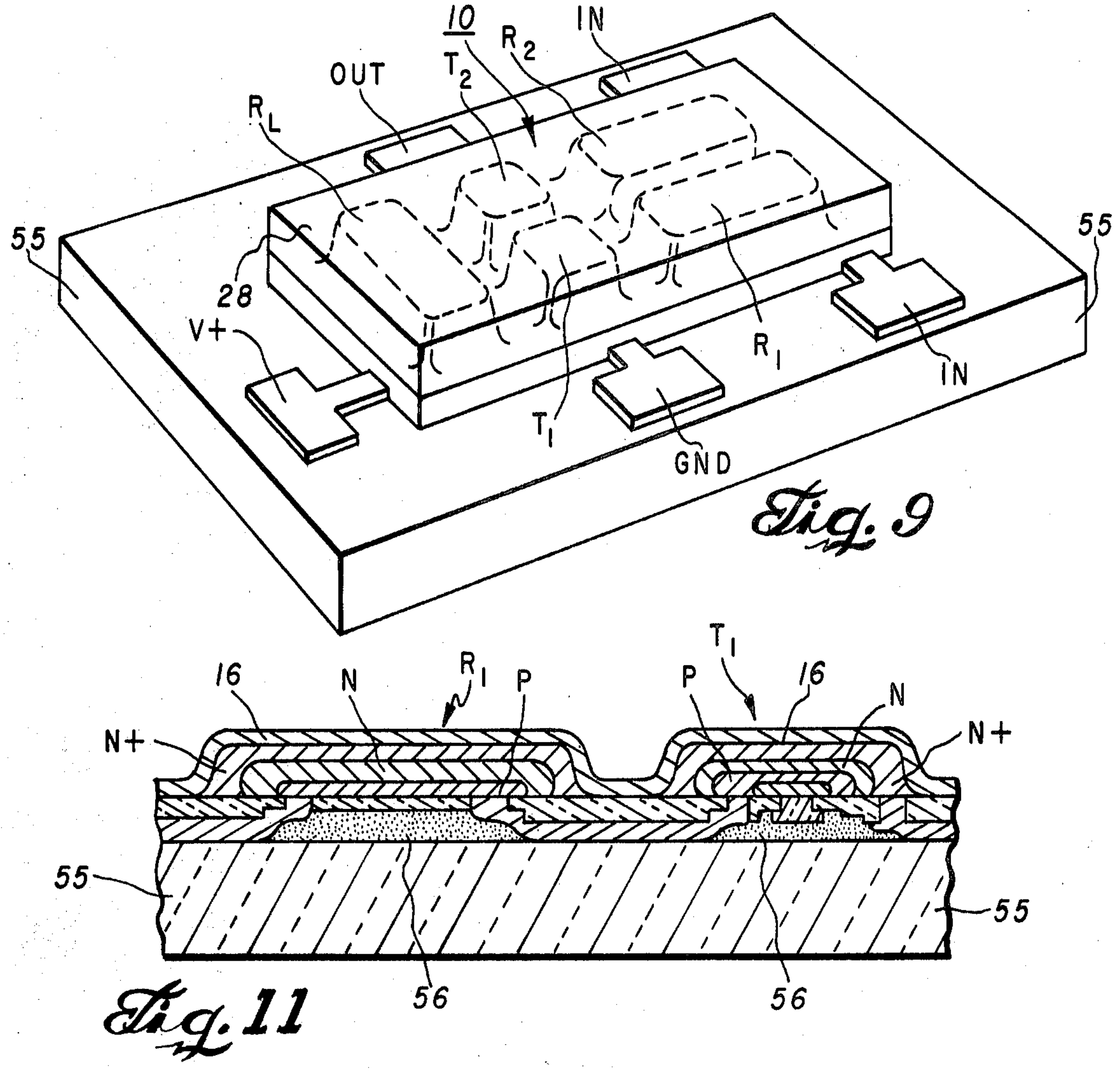
FIG. 9 is a pictorial view of the device shown in FIG. 8 after the device has been mounted face down upon an insulating substrate having external expanded leads thereupon.
FIG. 11 is a sectional view of a portion of the structure shown in FIG. 10 taken along the section line 11–11.

In accordance with this latter objective, the device 10, with the individual interconnected circuit components, is inverted and mounted upon an insulating substrate 55 for example ceramic, in the manner depicted in FIG. 9 so that the polycrystalline layer 28 forms the top surface of the device. The substrate 55 has a series of expanded leads (not shown) deposited in a conventional manner upon its upper face, the leads terminating in bonding pads (shown in FIG. 9) for external connections (input terminals, ground, etc.). The device 10 is then oriented upon the substrate 55 so that the bonding pads 50—54 shown in FIG. 8 are in contact with the respective expanded leads upon the substrate 55. Through a conventional technique, such as soldering the bonding pads and the leads are then physically joined to make electrical connection, while the entire structure itself is cemented to the ceramic substrate 55 by a suitable adhesive, as epoxy.

Figure 10:
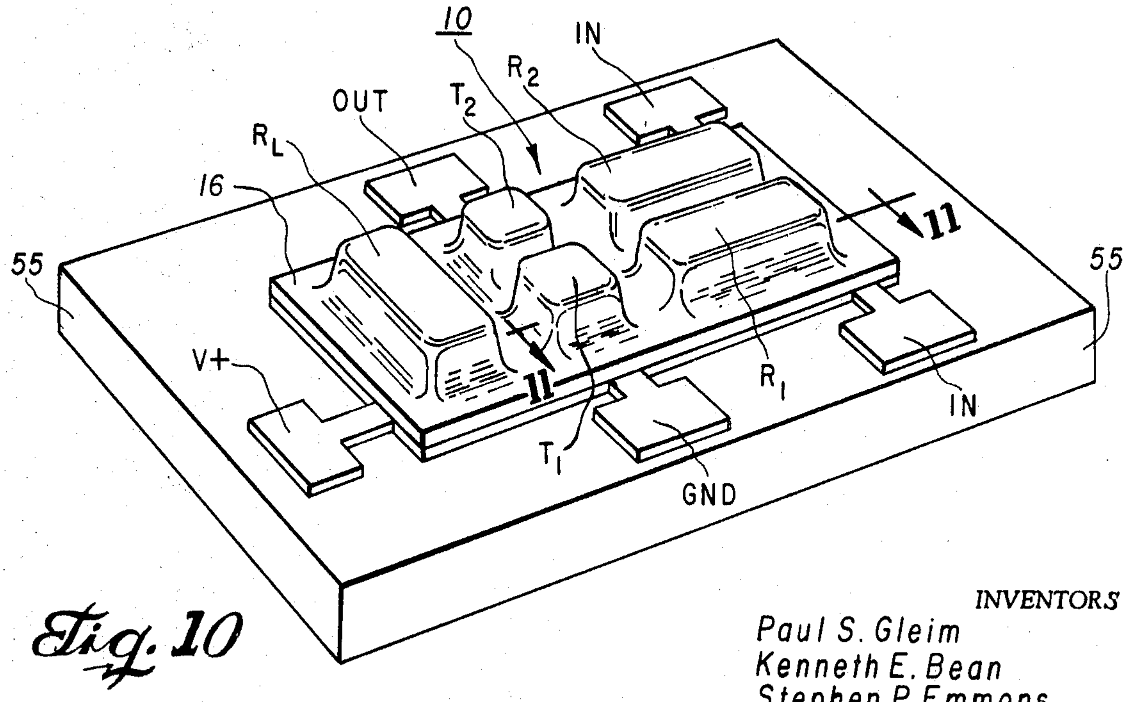
FIG. 10 is a pictorial view of the structure shown in FIG. 9 after the polycrystalline material has been removed, the components isolated from each other by the silicon carbide layer and the surrounding ambient.

As the next step in the process, the polycrystalline semiconductor material 28 is completely removed from the top surface of the device 10 resulting in the structure shown in FIG. 10 (and partially in section in FIG. 11), whereby each of the individual interconnected circuit components are mounted upon the ceramic substrate 55 within mesas isolated from each other by the high resistivity layer of silicon carbide and the surrounding ambient (air for example). This removal is accomplished by applying an etchant, such as a mixture of hydrofluoric acid (2 parts per volume), nitric acid (15 parts per volume), and acetic acid (5 parts per volume), to the top surface of the device, whereby all of the polycrystalline material 28 is etched away, while the individual components are protected from the etchant by the layer 16 of silicon carbide which acts as an etch barrier. Without the presence of the etch resistant silicon carbide layer 16, the individual components within the mesas would be destroyed. The expanded leads on the substrate 55 are protected from the etching step either by forming a protective wax coating over the leads or by using an etchant that will not attack the metal.

Figure 12:
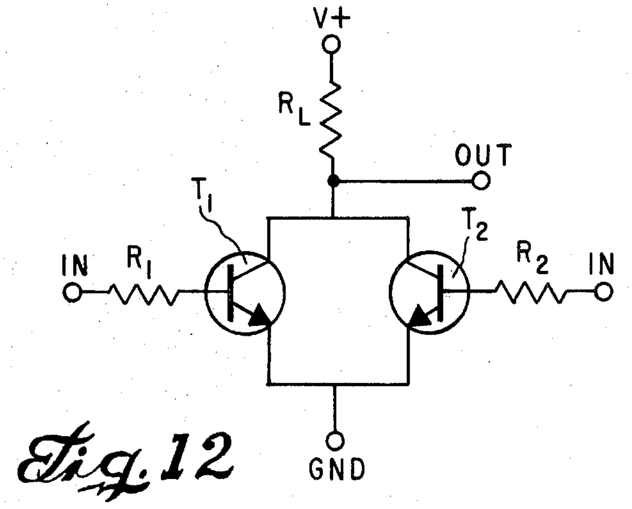
FIG. 12 is a schematic diagram of the integrated circuit contained within the device of FIG. 10.

FIG. 11 is a sectional view of a portion of the device of FIG. 10 showing the interconnected components $R_1$ and $T_1$ mounted upon the insulating substrate 55 with the epoxy layers 56. FIG. 12 shows the schematic form of the logic circuit illustrated in FIG. 10.

There is now described with reference to FIGS. 13—18 the fabrication of a thermal print head of the type shown in copending application Ser. No. 492,174, filed Sept. 30, 1965 whereby an etch-resistant layer, as silicon carbide, provides an "etch barrier."

Referring now to FIG. 13, there is depicted a top view of the thermal print head 1 comprising a wafer 110 of semiconductor material, silicon for example, having five "characters" 111—115 formed therein. Each of the characters is composed of a matrix of array of thermal printing elements such as the elements 121—125 of the character 111. Each element is a raised mesa of semiconductor material with a layer of silicon carbide 160 over the top of the mesas and the rest of the slice 10 (the fabrication of which will be subsequently described with reference to FIGS. 15—18), each mesa containing an interconnected diode and resistor. The particular array or the dimensions of the characters are not critical. In the particular embodiment herein shown and described, however, each character is composed of a 5 × 5 array of printing elements, each of the printing elements, 121—125 for example, being approximately 0.016 inch in length and 0.012 inch in width, the spacing between each element being approximately 0.004 inch. The silicon bar 110 may be approximately 0.3 inch in width by 0.5 inch in length and having a thickness of 0.001 inch. The active printing surface (in other words, the "characters" and their spacing) occupies an area of approximately 0.1 inch by 0.5 inch, and is centrally located upon the wafer 110.

The silicon wafer 110 with the mesas therein is mounted upon a ceramic substrate 120 so that the metallized leads 130—132, for example, formed upon the sides of the substrate 120 interconnect with the expanded leads 130*a*—132*a*, respectively, located on the underside of the excess material of the wafer 10. These expanded leads, as well as the other expanded leads, are actually extensions of the second level interconnections which make contact to the various first level interconnections of the printing elements shown in FIG. 14. The metallized leads 130—132 may be formed directly upon the surface of the ceramic substrate 120, or may be formed within slots within the ceramic. The joining of the expanded leads 130*a*—132*a* to the external metallized leads 130—132 may be accomplished by any conventional technique as, for example, by flow solder fillets. An epoxy may then be placed under the overhanging portions of the silicon slice to provide added mechanical support.

The actual operation of the thermal printer may be accomplished by various techniques and is not restricted to any one method of excitation of the appropriate heating elements. For example, a short high power pulse may be applied to selected external leads, such as 130—132, the pulse causing current to flow through resistors of select printing elements, the selected printing elements heating up to say 300° C in a pattern corresponding to the letters or numbers to be printed. The selection of the proper leads to be energized may be accomplished manually or by a separate diode digital decoder, for example. Accordingly, as shown in FIG. 13, select elements of the "characters" 111—115 may be heated to define the number 1, 2, 3, 4, and 5, respectively, which then are printed on heat sensitive paper which has been indexed over the face of the thermal print head 1. (The select elements which have been heated are represented on FIG. 13 by a double crosshatching, and may be best seen by holding the drawing at arms length from the eye.) The printing may be accomplished, for example, by simultaneously heating select elements of "characters" 111—115, thereby printing a whole line at a time, or by heating the select elements of the characters in a manner so as to sequentially print out the numbers 1 through 5.

Referring now to FIG. 14, there is depicted an underside plan view of a portion of one of the characters 111, showing some of its heating elements 140, 141, 142, and 143 and a typical, but not restrictive, pattern of interconnections. Each of the heating elements comprises a raised mesa of semiconductor material (as observed in the cross-sectional view of FIGS. 15—18), a diode and resistor pair such as $D_{140}$ and $R_{140}$, being formed by conventional masking and diffusion techniques, for example, in the base of the mesa, the pair being interconnected with each other and with the rest of the system. The function of the resistors $R_{140}$, $R_{141}$, $R_{142}$, and $R_{143}$ is to provide the source of heat for each printing element, and the function of the diodes $D_{140}$, $D_{141}$, $D_{142}$, and $D_{143}$ is to limit the current flow through only those resistors which are to be heated. First level interconnectors such as 150 and 151 ohmically connect the P-type regions of the diodes $D_{140}$ and $D_{141}$ and the P-type regions of diodes $D_{142}$ and $D_{143}$ to the second level interconnector 175 respectively, and first level interconnectors 152, 153, and 154 connect the ends of the resistor $R_{140}$ and to other resistors of other mesas (not shown in FIG. 14) to the second level interconnectors 130*a*, 131*a*, and 132*a*, respectively.

Figure 15:
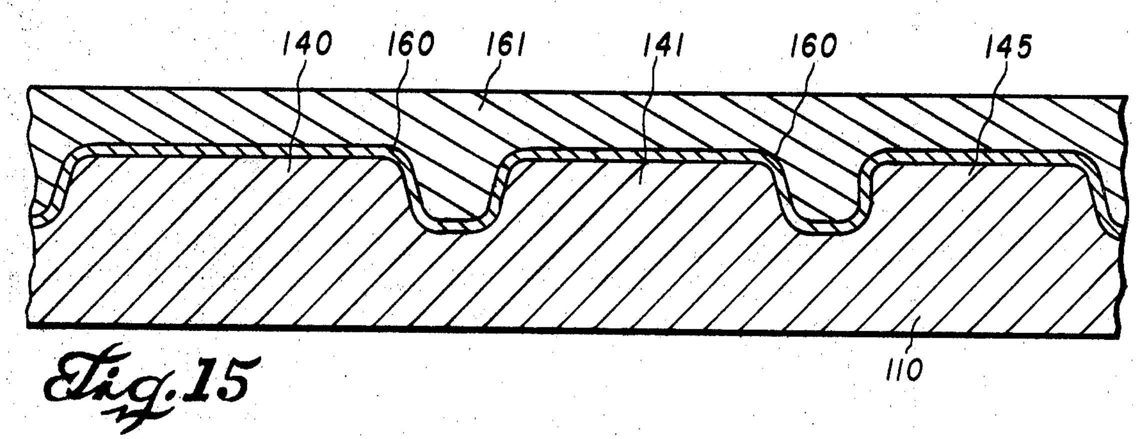

With reference to the cross-sectional views of FIGS. 15—18 there is now described the fabrication of the novel print head of this invention, particularly the formation of the silicon mesa thermal printing elements. Single crystal semiconductor material, such as silicon, is used as the starting material for a slice 110. A portion of this slice is shown in FIG. 15. The top surface of the slice is first masked and etched to form a pattern of raised mesas such as 140, 141, and 145. The masking may be by a material such as wax or preferably by photoresist techniques which permit excellent geometry control. The height of the mesas 140, 141, and 145, for example, or in other words, the depth of the etching may be approximately 1.5 to 2 mils. After the mesas are formed, the top surface of the slice is covered with a coating 160 of silicon carbide which may be formed by the technique previously described with reference to FIG. 2, to a thickness of perhaps 0.3 to 0.8 mil.

A layer 161 of material, for example polycrystalline semiconductor material, is now deposited over the top surface of the slice 110 adjacent the silicon carbide layer 160, as seen in FIG. 15 in the same manner as previously described. As the next step in the fabrication of the thermal printing head, the structure of FIG. 15 is subjected to a lapping and polishing treatment on its lower face to remove all the original silicon material except that portion remaining within the mesas 140, 141, and 145, as illustrated in FIG. 16.

Figure 16:
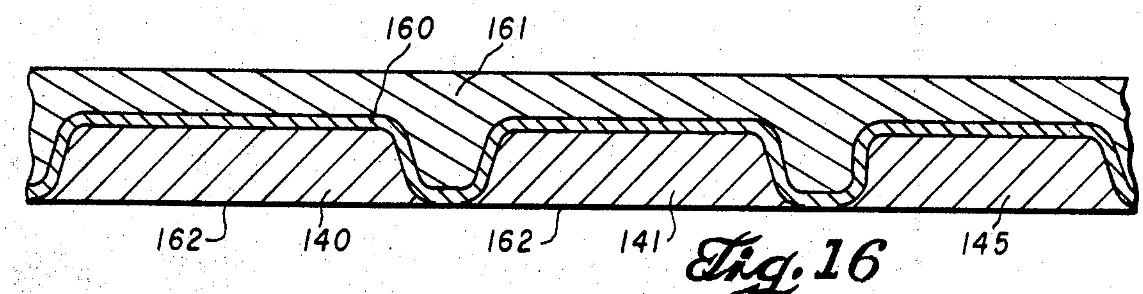
Figure 17:
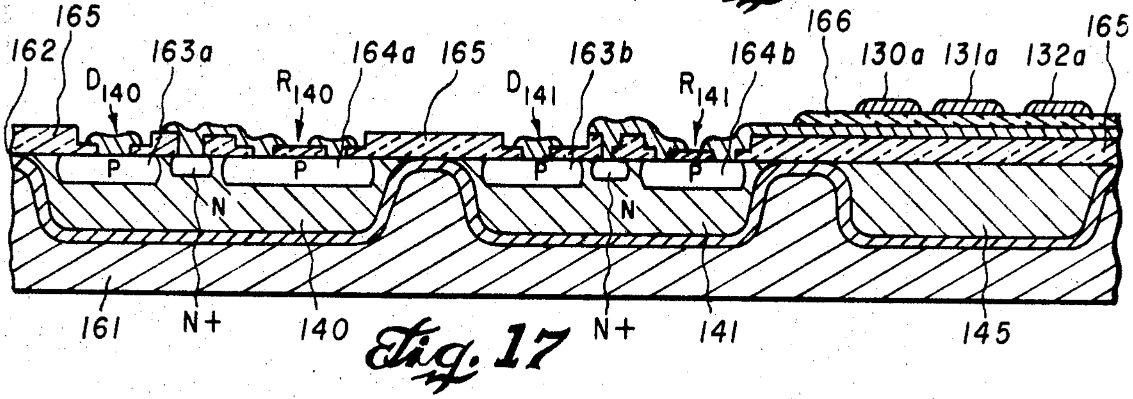

Inverting the structure and looking at what was the bottom surface of face 162 of FIG. 16, but what will now be considered the top face of the unit, the structure appears as in FIG. 17. The mesa regions 140 and 141 now serve as regions into which subsequent diffusions, or upon which epitaxial depositions, may be made in order to fabricate the diode-resistor pair of each printing element. In this particular embodiment, the diode-resistor pair $D_{140}$ and $R_{140}$ and $D_{141}$ and $R_{141}$ are formed by conventional oxide masking and diffusion operations in the N-type material of mesa elements 140 and 141, respectively.

P-type diffused regions 163*a* and 163*b* provide the respective anodes of the diodes $D_{140}$ and $D_{141}$, while elongated P-type regions 164*a* and 164*b*, formed simultaneously with the anode regions, provide the resistors $R_{140}$ and $R_{141}$. The N-type material of the mesas 140 and 141 provide the cathodes of the diodes $D_{140}$ and $D_{141}$. Contact to the N regions are made through low resistivity N+ regions as shown. The diffusion operations utilize silicon oxide masking as mentioned so that as oxide layer 165 is formed which acquires a stepped configuration in the final device. Openings are made in the oxide where contact is necessary, then metal film is deposited over the oxide and selectively removed to provide the desired contacts and interconnections.

It is to be observed that the silicon mesa 145 is masked with the silicon oxide layer 165 during the formation of the diodes and resistors in the various printing elements. This region provides the spacing between the individual "characters" as also observed in FIGS. 13 and 14. The second level interconnections 130*a*, 131*a*, and 132*a*, for example, are formed over those regions between the characters rather than over the printing elements in order to prevent exposure of insulation between leads to the high temperature thermal transients associated with the thermal printing elements. An insulating layer 166 formed of silicon dioxide, for example, and capable of withstanding high temperatures is formed by conventional techniques intermediate the first level interconnections and the second level interconnections 130*a* and 130*b*, as shown in FIG. 17.

Figure 18:
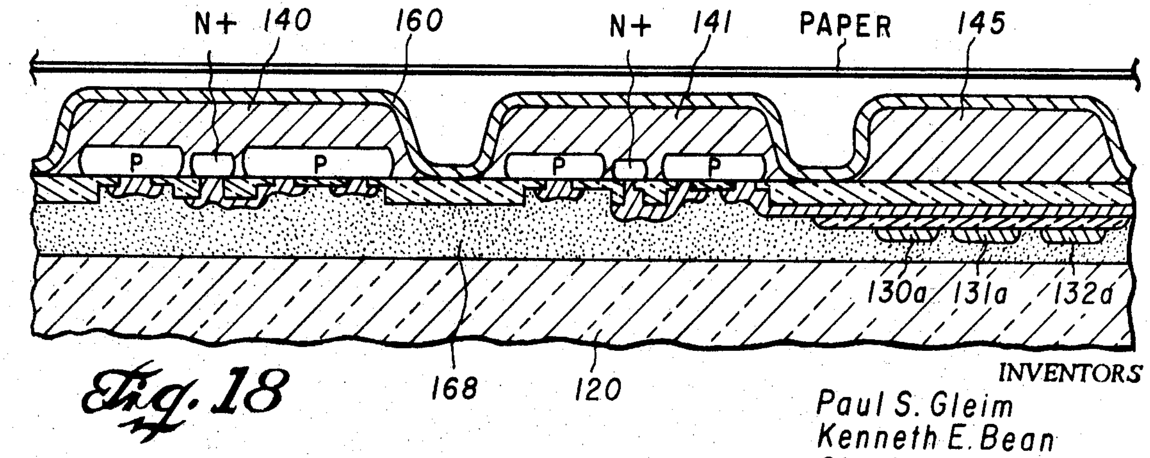

As the final steps in the fabrication of the thermal print head, the composite structure with the individual printing elements is sawed into the individual wafers and inverted and mounted upon ceramic substrate 120 with a suitable adhesive 168, such as epoxy, as shown in FIG. 18. The wafer with the mesa printing elements is aligned so that the second level interconnections 130*a*, 131*a*, and 132*a*, for example, engage the appropriate metallized lead pattern on the ceramic substrate, as shown in FIG. 13, the joining of the metal being accomplished by soldering. As the next step in the process, the polycrystalline semiconductor layer 161 is completely removed, resulting in a structure shown in FIG. 18, whereby each of the mesa thermal printing elements 140 and 141, for example, are isolated from each other by the layer 160 of silicon carbide and the surrounding ambient (air, for example). This removal is accomplished by applying an etchant such as a mixture of hydrofluoric acid (2 parts per volume), nitric acid (15 parts per volume) and acetic acid (5 parts per volume) to the top surface, whereby all of the polycrystalline material 161 is etched away, while the semiconductor material within the individual mesas is protected from the etchant by the layer 160 of silicon carbide acting as an etch barrier.

As a result of the above described process, a matrix of mesa printing elements, such as 140 and 141, is produced, the complete structure providing numerous advantages. As seen in FIG. 18, the diode-resistor pair of each element is positioned away from the surface over which the thermal sensitive paper passes, the silicon materials within the mesas and the silicon carbide coating 160 providing the protection for these components. The final structure, even without the silicon carbide, will offer considerable wear resistance, the silicon material itself affording substantial protection from the abrasive action of the thermal sensitive paper. The presence of the silicon carbide layer 160, however, affords much greater protection for both the components and the overlying silicon material. In addition, since the interconnections are also formed away from the upper surface, they will be protected, providing greater reliability.

The removal of the polycrystalline material between each mesa, the silicon carbide acting as an "etch barrier," resulting in the gaps between each printing element, provides substantial thermal isolation between each of the printing elements, thereby reducing heat "spillovers" into the adjacent elements and keeping the quantity of power required to heat each element at a minimum.

While the invention has been described with reference to specific methods and embodiments, it is to be understood that this description is not to be construed in a limiting sense. Various modifications of the disclosed embodiments, as well as other embodiments of the invention, may become apparent to persons skilled in the art without departing from the spirit and scope of the invention as defined by the appended claims.

We claim:

1. In a method for fabricating a semiconductor device, the steps of:
a. forming a mesa upon a body of monocrystalline semiconductor material;
b. forming a layer of etch resistant material over said mesa;
c. depositing a layer of polycrystalline semiconductor material upon said layer of etch resistant material over said mesa; and
d. etching said layer of polycrystalline semiconductor material with an etchant which does not attack said etch resistant material to any appreciable degree until the layer of etch resistant material over said mesa stops further etching.

2. In a method for fabricating a semiconductor device, the steps of:
a. forming a mesa upon a body of semiconductor material;
b. forming a layer of silicon carbide over said mesa;
c. depositing a layer of semiconductor material upon said layer of silicon carbide over said mesa; and
d. etching said layer of semiconductor material with an etchant which does not attack silicon carbide to any appreciable degree until the layer of silicon carbide over said mesa stops further etching.

3. A method for making a semiconductor network, comprising the steps of:
a. etching a plurality of mesas within a body of semiconductor material;
b. forming a layer of etch resistant material over the said plurality of mesas;
c. depositing a layer of semiconductor material upon said layer of etch resistant material over said plurality of mesas;
d. removing a portion of the semiconductor material of said body by lapping to remove all material below the said mesas;
e. forming at least one circuit component within each of said plurality of mesas; and
f. etching said layer of semiconductor material with an etchant which does not attack said etch resistant material to any appreciable degree until the said layer of etch resistant material over said mesas stops further etching.

4. A method for making an integrated circuit structure, comprising the steps of:
a. etching a plurality of mesas within a body of silicon semiconductor material;
b. forming a layer of silicon carbide over the said plurality of mesas;
c. depositing a layer of polycrystalline semiconductor material upon said layer of silicon carbide over said plurality of mesas;
d. lapping said body to remove the silicon semiconductor material of said body below the said mesas;
e. forming at least one circuit component within each of said plurality of mesas; and
f. etching said layer of polycrystalline semiconductor material with an etchant which does not attack silicon carbide to any appreciable degree until the said layer of silicon carbide over said mesas stops further etching.